3,813,343
Patented May 28, 1974

3,813,343

DIMETHYL SULFOXIDE CONTAINING CLEANER COMPOSITIONS

Cromwell D. Mukai, Berkeley Heights, and Bernard Weinstein, North Plainfield, N.J., assignors to American Home Products Corp., New York, N.Y.

No Drawing. Filed Jan. 10, 1972, Ser. No. 216,827
Int. Cl. C11d *9/14, 3/34, 3/44*
U.S. Cl. 252—111 4 Claims

ABSTRACT OF THE DISCLOSURE

Cleaning compositions are described comprising (a) a non-caustic inorganic cleaner, (b) an amine and/or ammonia, (c) an organic solvent insoluble or partially soluble in water, and (d) dimethyl sulfoxide. These compositions are useful in removing deposits such as grease, oil, food, etc. from surfaces such as oven walls.

The present invention relates to cleaning compositions useful for cleaning ovens, pots, barbecue equipment, tiles, walls, etc.

One aspect of the present invention is to provide cleaning compositions, particularly oven-cleaning compositions, which effectively remove grease, fat, etc. from oven surfaces at temperatures as low as 150° F. and which do not fume.

Another aspect of the present invention is to provide an oven-cleaner composition which is caustic alkali free, thereby eliminating many of the hazards associated with known prior art caustic alkali compositions.

A further aspect of the present invention relates to the use of DMSO in oven cleaner formulations to facilitate removal of grease and fat deposits.

These and other aspects of the present invention will become apparent from the following description.

The cleaning compositions of this invention comprise (1) about 1 to about 15% by weight of an inorganic cleaner, (2) ammonia and/or an organic amine compound, (3) about 0.7 to about 20% by weight of a dimethyl sulfoxide, preferably about 2 to about 10% by weight, (4) 0 to about 25% by weight of a water-insoluble or partially soluble solvent, preferably about 6 to 20% by weight, (5) 0 to about 7% by weight of at least one surfactant, preferably from about .01 to 3% by weight. Water is present in the composition in an amount from 60 to 90% by weight of the total composition.

Additionally, the compositions of the present invention may contain one or more additional ingredients useful in oven cleaning compositions such as thickening agents, humectants, abrasives, foam stabilizers (surfactants), viscosity modifiers, perfumes, etc.

The inorganic cleaners (builders) useful in the compositions described herein are selected from the alkali metal or ammonium salts of carbonic, phosphoric, boric and silicic acids. Illustrative compounds are sodium, potassium or ammonium carbonates, phosphates such as trisodium phosphate, tripotassium phosphate, trilithium phosphate, sodium metapolyphosphate, etc.; silicates such as sodium disilicate, potassium disilicate, lithium disilicate, and the corresponding orthosilicates, sesquisilicates and metasilicates. The corresponding borates are also useful such as sodium borate, etc.

The amines useful in the compositions are non-toxic primary or secondary amines, preferably primary amines which may be either aliphatic, aromatic or hetercyclic. Illustrative of these amines are N-2-hydroxyethyl diethylene triamine, monoethanolamine, diethanolamine, propanolamine, ethylamine, benzylamine, butylisopropanolamine, isopropanolamine and 2-[2-(3-aminopropoxy) ethoxy] ethanol. The preferred amines are the aliphatic primary amines having at least one amine group on a terminal carbon atom and having a molecular weight below about 300. The preferred specific amines are N-2-hydroxy ethyl diethylene triamine and 2-[2-(3-aminopropoxy) ethoxy]ethanol. The amines, when present in the compositions of the present invention may be used in an amount of about 1 to about 20% by weight of the total composition, preferably between about 2 and 10% by weight.

Ammonia can be used in place of the amine or these materials may be used in combination. It is present in the composition as ammonia in solution. The ammonia may be added to the formulation as ammonia water, or a gaseous ammonia, or in the form of a neutral salt or other compound of ammonia which upon reaction with the inorganic cleaner in the composition yields free ammonia to provide ammonia water. Illustrative of ammonium salts are ammonium acetate, ammonium sulfate, ammonium chloride, etc. The total weight of ammonia expressed as $NH_3$ in the composition may vary but is about 0.1 to about 10% based on the weight of the water in the composition. Larger quantities may be used but offer no advantages and result in loss of ammonia through vaporization. The preferred quantity of ammonia is about 0.1 to about 4% by weight.

The surfactant used in the present compositions is chosen to provide a stable foam which helps to maintain a deposit of the composition upon the site sought to be cleaned. The surfactant may be a anionic material (e.g. a soap) which may be used alone but preferably in combination with a non-ionic surface active agent or another anionic agent. Illustrative of soaps which may be used in the present invention are the well-known salts of fatty acids having up to twenty-two carbon atoms. These may include the Na, K, Li and ammonium or amine salts of myristic, palmitic, stearic, behenic, oleic, lauric, abietic, capric, caproic, caprylic, ricinoleic, linoleic, hydrogenated and dehydrogenated abietic acids, the surface active hydrolysis products of tallow, coconut oil, cottenseed oil, soybean oil, peanut oil, sesame oil, linseed oil, olive oil, corn oil, castor oil and the like. The soap not only aids in removal of oven grime but also opacifies the composition. About 0.1 to about 4% by weight of a soap and/or other anionic surfactant is used, the preferred quantity of a soap being about .05 to about 2% by weight. The non-ionic and anionic surfactants are low foaming materials in the following classes: aliphatic polyethers; polyoxyethylene esters of fatty acids; sulfated esters; alkylarylpolyglycol ethers; aliphatic ester sulfates; alkali metal salts of alcohol sulfates; organic phosphate esters; an alkylphenoxypolyethyleneoxyethanol; ether terminated polyethoxy ethanols such as described in U.S. Pat. 3,281,475, the disclosure of which incorporated herein by reference.

The preferred non-ionic surfactants are represented by the formula

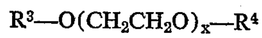

$$R^3—O(CH_2CH_2O)_x—R^4$$

wherein $R^3$ selected from the class consisting of a $C_8$–$C_{18}$ alkyl radical, either straight chain or branch chain and an alkyl phenyl radical wherein the alkyl radical is $C_8$–$C_{18}$ straight or branch chain. Illustrative of $R^3$ are p-t-octylphenyl, p-nonylphenyl, p-dodecylphenyl, n-dodecyl, n-octadecyl, tridecyl, etc.; $R^4$ is selected from the class consisting of tertiary $C_4$–$C_{12}$ alkyl groups and an acyclic radical of the formula $C_{10}H_{17}$ derived from monoterpenes. Illustrative of $R^4$ is t-butylisobornyl; *x* is a number from about 7 to 50, preferably 9 to 35. $R^3$ is preferably p-nonylphenyl. Preferably, about 0.5 to 4% by weight of the non-ionic or anionic surfactant is used in addition to the use of a soap as previously described.

The solvent used in the compositions of the present invention is one which is capable of dissolving animal fats deposited on oven surfaces. The solvent is no more than about 20% soluble in water at room temperature and atmospheric pressure and has a boiling point above 250° F. Illustrative of suitable solvents are diphenyl ether, 2-ethanol-hexanol - 1,2 - ethylhexanediol-1,3,2-phenoxyethanol, monophenyl ether of diethylene glycol, phenylmethylcarbinol, benzyl alcohol, phenylglycol ethers (e.g. a mixture of 30% phenyl Carbitol and 70% phenyl Cellosolve), octanol-2, n-octanol, decanol, isodecanol, dodecanol, etc. The mixture of phenyl glycol ethers is the preferred solvent.

Optional ingredients may be present in the compositions. For example, thickening agents provide body to the composition, allowing it to remain in contact with the oven surface without running. Exemplary of useful thickening agents are colloidal magnesium aluminum silicate, alginates, carboxymethyl cellulose, carboxyethyl cellulose, bentonite and other well-known materials such as described in U.S. Pat. 3,296,147. Humectants are present in the composition to aid in slowing the evaporation of the water present in the composition and some provide a solvent effect in removing grease. Exemplary of useful humectants are the glycols (propylene glycol and polyethylene glycol) and glycerol.

The abrasives are added to provide additional cleaning power to aid in removing stubborn stains; additionally, certain abrasives serve to increase viscosity and to absorb the emulsifier and propellant in pressurized aerosol systems, providing a superior product. Exemplary of abrasives producing all the above properties is a silica such as "Cab-O-Sil M5" or "Aerosil 200."

A foam stabilizer may be added to increase the adherence of the composition to the walls of the oven and is preferably a wax having a softening point in the range of 100° to 200° F. The wax may be added in pellet or powder form to the mixture of the composition and propellant. Illustrative of suitable waxes are beeswax, microcrystalline wax, etc.

The herein disclosed compositions are useful in cleaning ovens when applied to cold (ambient room temperature) or hot (up to 300° F.) soiled ovens and allowed to remain on the soiled surfaces until the grime is softened, followed by wiping away the composition, preferably with a damp cloth or sponge. Extremely high temperatures impede cleaning action due to the fast evaporation of the water present in the composition. However, the most efficient method of using the disclosed compositions is to apply them to an oven preheated of 150°–200° F., which is ideally maintained at that temperature range during the entire cleaning procedure (i.e. not turned off). The composition is allowed to remain on the heated oven surfaces for about ten to about thirty minutes, depending on degree of soiling, followed by removal with a damp cloth or sponge.

In the preferred form, the oven cleaning compositions are supplied in self-contained valve-controlled aerosol units which provide a fine spray of foam upon activation of the valve. The aerosol container unit consists of a pressure-tight aerosol container having a valve-controlled opening and containing a composition as set forth herein and from about 2.00% to about 25.00% of a propellant. Propellants are selected from the well-known compatible propellants such as isobutane, isobutane/propane, dichlorodifluoromethane (Freon 12), trichlorofluoromethane (Freon 11), dichlorotetrafluoroethane (Freon 114) and 1,1,2-trichlorotrifluoroethane (Freon 113) or mixtures thereof. The propellant should be effective at atmospheric temperature and not adversely react with any components of the composition.

The following examples are illustrative of the compositions of the present invention:

EXAMPLE 1

A composition of the following ingredients is prepared:

| Component: | Percent by weight |
|---|---|
| "Triton CF54" | 0.75 |
| Potassium oleate | 0.16 |
| Water | 48.68 |
| Potassium phosphate | 6.23 |
| Finely divided silica | 0.62 |
| Magnesium aluminum silicate (3% in water) | 43.56 |

The foregoing composition is prepared as follows:

The required weight of mineral magnesium aluminum silicate is added to de-ionized water at 170° F. with efficient agitation until a smooth mixture is obtained containing a 3% dispersion of magnesium aluminum silicate.

"Triton CF54," potassium oleate, water, potassium phosphate, finely divided silica and magnesium aluminum silicate dispersion are mixed together consecutively in the indicated percent by weight, using mechanical agitation. During the mixing operation, the magnesium aluminum silicate dispersion is added slowly under good agitation. The resulting mixture is a paste-like material.

EXAMPLE 2

| Ingredients: | Percent by weight |
|---|---|
| Composition of Example 1 | 81.6 |
| Dimethyl sulfoxide | 6.05 |
| Ammonium hydroxide (28% $NH_3$) | 2.17 |
| 2-ethyl hexanol-1 | 10.18 |

This composition is prepared as follows:

To the composition of Example 1 there is added consecutively dimethyl sulfoxide, ammonium hydroxide and 2-ethyl hexanol-1 with mechanical agitation, the 2-ethyl hexanol-1 being added slowly. The resulting homogenous mixture has a pH of 12.3.

The following cleaner-compositions are prepared in the same manner as described in Example 2.

EXAMPLE 3

| Ingredients: | Percent by weight |
|---|---|
| Composition of Example 1 | 81.60 |
| Dimethyl sulfoxide | 6.05 |
| Ammonium hydroxide (28% $NH_3$) | 2.17 |
| Mixture of 30% phenyl Carbitol and 70% phenyl Cellosolve | 10.18 |

EXAMPLE 4

| Ingredients: | Percent by weight |
|---|---|
| Composition of Example 1 | 83.00 |
| Dimethyl sulfoxide | 6.15 |
| Ammonium hydroxide (28% $NH_3$) | 0.55 |
| Mixture of 30% phenyl Carbitol and 70% phenyl Cellosolve | 10.30 |

EXAMPLE 5

| Ingredients: | Percent by weight |
|---|---|
| Composition of Example 1 | 81.60 |
| Dimethyl sulfoxide | 6.05 |
| Ammonium hydroxide (28% $NH_3$) | 2.17 |
| 2-ethyl-hexanediol-1,3 | 10.18 |

EXAMPLE 6

| Ingredients: | Percent by weight |
|---|---|
| Composition of Example 1 | 79.86 |
| Dimethyl sulfoxide | 5.92 |
| Ammonium hydroxide (28% $NH_3$) | 4.26 |
| Mixture of 30% phenyl Carbitol and 70% phenyl Cellosolve | 9.96 |

EXAMPLE 7

| Ingredients: | Percent by weight |
|---|---|
| Composition of Example 1 | 82.62 |
| Dimethyl sulfoxide | 4.45 |
| 2-[2-(3-aminopropoxy)ethoxy]ethanol | 3.00 |
| Mixture of 30% phenyl Carbitol and 70% phenyl Cellosolve | 9.96 |

EXAMPLE 8

| Ingredients: | Percent by weight |
|---|---|
| Composition of Example 1 | 82.62 |
| Dimethyl sulfoxide | 4.45 |
| N-2-hydroxy ethyl diethylene triamine | 3.00 |
| Mixture of 30% phenyl Carbitol and 70% phenyl Cellosolve | 9.93 |

EXAMPLE 9

An aerosol formulation is prepared with the following ingredients:

| | Percent by weight |
|---|---|
| Composition of Example 2 | 98.0 |
| Isobutane | 1.7 |
| Propane | 0.3 |

The formulations of Example 2 through 8 can be applied by a brush to surfaces to be cleaned or they may be incorporated into aerosol packages as exemplified by Example 9 to be used as sprays or they may be incorporated into squeeze containers.

The efficiency of the cleaning compositions within the scope of the present invention was tested by spraying an aerosol preparation containing the cleaning composition onto panels upon which was baked an oven soil composition composed of 84% by weight beef tallow, 8% flour and 8% powdered sugar. The panels used were of varying size including 4" x 8" which were white in color. The oven soil composition was brushed on plates at the rate of 0.04 g./sq. inch and the plates baked in an oven at 500° F. for seventy-five minutes. The soiled panels are placed in an oven maintained at a temperature between 150°–200° F. for about ten minutes. One half of each panel is sprayed with a standard cleaning composition using a shield to confine the spray from the other half of the panel. The remaining half of each panel tested is sprayed with a composition of the present invention. Thereafter, the oven door is closed and the oven heater turned off, the cleaners being allowed to act on the soiled panels for ten minutes. The panels are then removed from the oven and the cleaner and soil wiped off from the panels with a wet sponge or brush. The degree of soil removal is estimated visually.

The cleaning efficacy of the compositions of Examples 2 through 8 dispensed from an aerosol package ranged from 75 to 95%.

What is claimed is:

1. A non-caustic cleaner composition useful in removing food deposits from surfaces consisting essentially of (a) about 60 to 90% water, (b) about 1 to about 15% by weight of an inorganic alkali metal or ammonium cleaner compound wherein the anionic portion of said inorganic cleaner compound is selected from the group consisting of a carbonate, phosphate, borate and a silicate, (c) at least one basic material selected from the class consisting of about 0.1 to 10% by weight ammonia based on the total weight of water in said cleaner composition and about 1 to 20% by weight of an aliphatic amine having a molecular weight below 300 selected from the group consisting of N-2-hydroxyethyl diethylene triamine, monoethanolamine, diethanolamine, propanolamine, ethylamine, benzylamine, butylisopropanolamine, isopropanolamine and 2-[2-(3 - aminopropoxy)ethoxy] ethanol, (d) about 2 to about 10% by weight of dimethyl sulfoxide, (e) about 6 to about 20% by weight of a solvent which is no more than about 20% soluble in water at room temperature and atmospheric pressure, said solvent having a boiling point above 250° F. and being capable of substantially dissolving saturated or unsaturated fats, selected from the group consisting of diphenyl ether, 2-ethanolhexanol-1, 2-ethylhexanediol-1,3, 2-phenoxyethanol, monophenyl ether of diethylene glycol, phenylmethylcarbinol, benzyl alcohol, oxtanol-2, n-octanol, decanol, isodecanol, dodecanol and mixtures thereof, and (f) about 0.5 to about 2% by weight of a soap combined with about 0.5 to about 4.0% by weight of a nonionic surface-active agent.

2. A non-caustic cleaner composition according to claim 1 wherein said aliphatic amine is selected from the class consisting of monoethanolamine, N-2-hydroxyethyl diethylene triamine, and 2-[2-(3-aminopropoxy)ethoxy] ethanol.

3. A non-caustic cleaner composition according to claim 1 wherein said basic material comprises ammonia in an amount between about 0.1 to about 4% by weight based on the total weight of the water in the composition.

4. A non-caustic cleaner according to claim 1 wherein component (e) is a mixture containing about 30 percent of the monophenyl ether of diethylene glycol and about 70 percent of the monophenyl ether of ethylene glycol.

References Cited

UNITED STATES PATENTS

| | | | |
|---|---|---|---|
| 3,681,250 | 8/1972 | Murphy | 252—158 |
| 3,663,445 | 5/1972 | Augustin | 252—117 |
| 3,658,711 | 4/1972 | Mukai et al. | 252—90 |
| 3,551,204 | 12/1970 | Bolger | 134—38 X |
| 3,296,147 | 1/1967 | Gatza | 252—153 |
| 3,031,409 | 4/1962 | Perlman | 252—158 |
| 2,978,421 | 4/1961 | Holloway | 134—38 X |
| 2,694,658 | 11/1954 | Crepeau | 134—26 |

OTHER REFERENCES

"Dimethyl Sulfoxide (DMSO)" Technical bulletin of Crown Zellerbach Corp., 1964, pages 5 and 24.

The Condensed Chemical Dictionary, 7th edition, by A. and E. Rose, Van Nostrand Reinhold Co., New York, 1966, p. 338.

HERBERT B. GUYNN, Primary Examiner

D. L. ALBRECHT, Assistant Examiner

U.S. Cl. X.R.

134—40; 252—110, 118, 121, 153, 523, 529, 530, 549, Dig. 4, 8, 10